United States Patent
Chen et al.

[19]

[11] Patent Number: 5,862,706
[45] Date of Patent: Jan. 26, 1999

[54] SHAFT DEFLECTION CONTROLLER

[75] Inventors: Yih-Jen D. Chen, Chandler; Gregory F. Heath, Mesa; Vijay J. Sheth, Mesa; Murugappan Meyyappa, Mesa, all of Ariz.

[73] Assignee: McDonnell Douglas Helicopter Company, Mesa, Ariz.

[21] Appl. No.: 682,029

[22] Filed: Jul. 16, 1996

[51] Int. Cl.⁶ ................................................ F16H 57/00
[52] U.S. Cl. ............................... 74/411; 74/416; 464/81; 464/87; 464/170; 464/106; 384/536; 384/99
[58] Field of Search .................. 74/411, 416; 464/81, 464/87, 170, 106, 185; 384/535, 536, 581, 582, 99

[56] References Cited

U.S. PATENT DOCUMENTS

| | | |
|---|---|---|
| 2,506,404 | 5/1950 | Woodfield et al. . |
| 2,534,142 | 12/1950 | Morton et al. . |
| 3,005,668 | 10/1961 | Szydlowski . |
| 3,011,840 | 12/1961 | Littleford . |
| 3,181,851 | 5/1965 | Troeger ........................................ 464/81 |
| 3,467,451 | 9/1969 | Marley . |
| 3,475,923 | 11/1969 | Spence ........................................ 464/81 |
| 3,709,570 | 1/1973 | Galbato . |
| 4,335,586 | 6/1982 | Kochendorfer et al. ................... 464/81 |
| 4,518,287 | 5/1985 | Bossler, Jr. . |
| 4,571,098 | 2/1986 | Rudnik ..................................... 384/536 |
| 5,135,442 | 8/1992 | Bossler, Jr. . |
| 5,172,985 | 12/1992 | Constancio ............................... 384/536 |
| 5,178,028 | 1/1993 | Bossler, Jr. . |
| 5,233,886 | 8/1993 | Bossler, Jr. . |
| 5,425,584 | 6/1995 | Ide ............................................. 384/99 |
| 5,439,360 | 8/1995 | Barito ....................................... 464/106 |
| 5,595,541 | 1/1997 | Ducugnon ................................. 464/87 |

FOREIGN PATENT DOCUMENTS 931581 7/1963 United Kingdom .

*Primary Examiner*—Rodney H. Bonck
*Assistant Examiner*—David M. Fenstermacher
*Attorney, Agent, or Firm*—Donald E. Stout; Kenton R. Mullins

[57] ABSTRACT

A shaft deflection controller includes an input driveshaft adapted for inputting power from an engine. The input driveshaft includes an axis of rotation and a spur pinion at an end of the input driveshaft. The axis of rotation of the input driveshaft changes, relative to a frame, with deflections of the input driveshaft. Two face gears are adapted for meshing with the spur pinion of the input driveshaft. A flexible shaft stabilizing mount includes an inner sleeve portion and a mounting flange. The inner sleeve portion includes a base portion connecting the inner sleeve portion to the mounting flange and a plurality of cage spring members. The mounting flange is connected to and concentric with the inner sleeve portion. The flexible shaft stabilizing mount controls the deflection of the input driveshaft by applying forces onto the input driveshaft, which tend to resist changes in the alignment of the axis of rotation of the input driveshaft. The flexible shaft stabilizing mount is connected to a rigid frame. An inner surface portion of a stiffening ring contains a curvature and surrounds and contacts the inner sleeve portion of the flexible shaft stabilizing mount.

34 Claims, 3 Drawing Sheets

SHAFT DEFLECTION CONTROLLER

BACKGROUND OF THE INVENTION

1. Field of the Invention

The present invention relates generally to a rotorcraft transmission system and, more particularly, to a shaft deflection controller for providing equal torque splitting and resonance-free operation to a shaft of the rotorcraft transmission system.

2. Description of Related Art

The prior art has developed a variety of apparatuses and systems for initiating and maintaining shaft alignment. In attempts to achieve accurate shaft alignment during operating conditions, many of these prior art devices implemented flexible shaft-to-shaft connecting devices. Typical shaft-to-shaft connecting devices utilized flexible mountings on high speed shafts. The flexible mountings were either coupled to each other or to the output shafts of the turbine engines. None of these shaft-to-shaft connecting devices, however, operated to provide shaft alignment in the context of a split gearing system.

Conventional flexible disk or diaphragm couplings have also been implemented for achieving shaft alignment, but these couplings were often larger and required more space than was usually available. These conventional couplings also offered little latitude in achieving a specific system stiffness through design implementations. The shaft-to-shaft connecting devices, on the other hand, were designed for those system stiffnesses which resulted in minimal vibration during brief shaft operation at critical vibration speeds. The shafts in these applications were usually operating supercritically, with operating speed values lying above the first critical speeds. The designs functioned to prevent shaft flailing and to retain shaft alignment during operation at critical speeds, as the shafts were brought up to operating speed.

Fundamental differences exist between split torque gearing and shaft-to-shaft connecting devices. The loads involved in a gearing system include radial, axial and tangential forces, in addition to overturning moments. In addition, gear tooth, rim and web deflections must be considered. Conventional torque split gearing designs specifically intended to achieve torque-splitting have typically met with only limited success in achieving equal division of torque. These designs included gear tooth indexing, elastomeric gear web designs and splined mountings requiring exact assembly adjustments for each design. Gear tooth, rim and web dimensions vary from one set to another, even for the same design. The above designs relied on selective adjustments made during assembly to account for these unique dimensions. These methods could not assure torque-splitting in typically-encountered applications, as they must be designed for a limited range of speed and load conditions (known vibration and deflection) and very tight dimensional and assembly tolerances. It is difficult if not impossible, however, to predict the gearing system stiffnesses and tooth deflections during operation, since these change for different load and speed conditions.

Designs of some conventional devices addressed the problem of bearing slippage in some instances, although the retention methods for these designs relied more often on the use of friction to prevent bearing slippage, such as the use of spring clamping. Failsafe features of some of these conventional devices relied upon single stops, such as pins, housing walls, or anti-flail rings, which would make contact abruptly with a flailing shaft. Significant shaft deflection prior to contact with emergency restraints would be unacceptable in a split-torque gearing system, however, since this could result in drive system failures. A need exists in the prior art for an apparatus, which can provide equal torque splitting without relying on selective assembly procedures, operate at sub-critical operation, and prevent deflections from reaching near-critical values before providing restraint.

SUMMARY OF THE INVENTION

The fundamental differences existing between split-torque gearing and shaft-to-shaft connecting devices, including differences in radial, axial tangential and overturning moments, in addition to gear tooth, rim and web deflections are all accounted for in the design of the shaft deflection controller of the present invention. The amount of shaft deflection allowed for by the shaft deflection controller of the present invention is dependent upon the stiffness of the flexible shaft stabilizing mount and the web, tooth, and rim stiffnesses of the two driven gears.

The shaft deflection controller of the present invention is capable of achieving an equal torque split between two face gears driven by a single pinion. The shaft deflection controller of the present invention is also adapted for dividing power equally between two gears of different sizes fed from a single pinion. The shaft deflection controller of the present invention achieves near resonance-free operation in a manner not achieved by the prior art, since, for example, prior art apparatuses do not directly involve either gearing or torque splitting.

The shaft deflection controller of the present invention is capable of achieving an equal torque split without relying on either selective assembly procedures, which can be costly and inaccurate, or severe limitations of gearset deflection, which can result in prohibitive weight penalties. Due to the near-equal torque split achieved by the shaft deflection controller of the present invention, the imparted tooth stresses are of a magnitude of approximately one-half that of the engine input torque, allowing for lighter and smaller gears. The subject invention yields equal torque splitting for a significant range of load, speed, deflection and dimensional tolerance conditions.

The shaft deflection controller of the present invention is designed for sub-critical operation, maintaining the shaft-bearing-gear system's first critical frequency at 25% above operating frequency, to assure resonance-free operation. The shaft deflection controller of the present invention can easily be modified for use in supercritical applications, as well. It is unlike existing conventional designs, which are used either to avoid resonance in supercritical shaft applications or to maintain alignment between high speed coupled shafts. Another advantage of the present invention over prior art is the use of a non-linear stiffening ring, which does not allow deflections to reach near-critical values before providing restraint but, rather, slowly increases the equivalent spring stiffness due to increasing spring contact with its complex-curvature surface.

The shaft deflection controller of the present invention includes an input driveshaft adapted for inputting power from an engine. The input driveshaft includes an axis of rotation and a spur pinion at an end of the input driveshaft. The axis of rotation of the input driveshaft changes, relative to a frame, with deflections of the input driveshaft. Two face gears are adapted for meshing with the spur pinion of the input driveshaft.

A flexible shaft stabilizing mount includes an inner sleeve portion and a mounting flange. The inner sleeve portion includes a bearing-contacting portion adapted for surrounding and contacting the bearing, a base portion connecting the inner sleeve portion to the mounting flange, and a plurality of cage spring members. The plurality of cage spring members are located parallel to one another. A plurality of rectangular apertures are disposed between the bearing-contacting portion and the base portion, defining the plurality of cage spring members. Each of the cage spring members connects the bearing-contacting portion to the base portion. The mounting flange is connected to and concentric with the inner sleeve portion. The mounting flange is connected to the inner sleeve portion with a bolt through one or more apertures in the mounting flange.

A bearing fits around the driveshaft and contacts a portion of the input driveshaft. The flexible shaft stabilizing mount contacts the bearing and controls the deflection of the input driveshaft by applying forces onto the input driveshaft, which tend to resist changes in the alignment of the axis of rotation of the input driveshaft. The flexible shaft stabilizing mount is connected to a rigid frame. The bearing, input driveshaft, and the flexible shaft stabilizing mount are all concentric. An inner surface portion of an elastomeric damper contains a complex curvature and surrounds and contacts the inner sleeve portion of the flexible shaft stabilizing mount.

A stiffening ring surrounds and contacts both the elastomeric damper and the inner sleeve portion of the flexible shaft stabilizing mount. The stiffening ring includes a stiffening-ring flange connected to and concentric with the stiffening ring, the stiffening-ring flange has at least one aperture for accommodating a bolt. The apertures of the stiffening-ring flange and the mounting flange are aligned for accommodating the same bolts. The elastomeric damper is sandwiched between the inner sleeve portion of the flexible shaft stabilizing mount and the stiffening ring. The inner surface portion contacts both the inner sleeve portion of the flexible shaft stabilizing mount and the stiffening ring.

Although an exemplary embodiment of the present invention has been shown and described, many other changes, modifications and substitutions, in addition to those set forth in the above paragraphs, may be made by one having ordinary skill in the art without departing from having ordinary skill in the art without necessarily departing from the spirit and scope of this invention.

DETAILED DESCRIPTION OF THE PRESENTLY PREFERRED EMBODIMENT

The following description is provided to enable a person skilled in the art to make and use the invention and sets forth the best modes contemplated by the inventor of carrying out his invention. Various modifications, however, will remain readily apparent to those skilled in the art.

Figure 1:
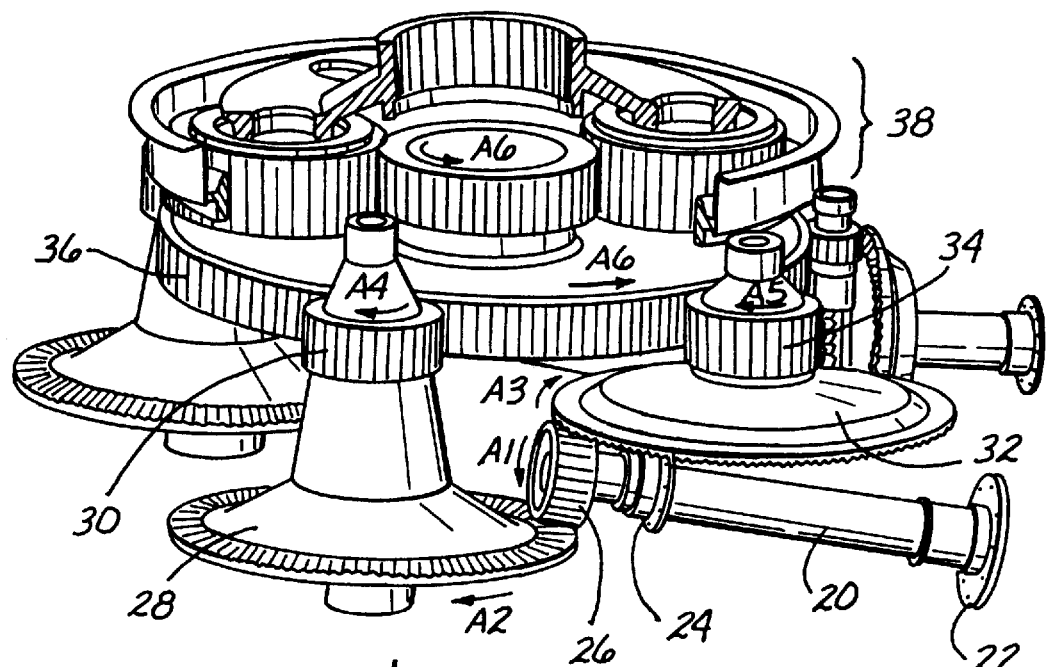
FIG. 1 illustrates the shaft deflection controller of the present invention in a three stage, split torque advanced rotorcraft transmission.

Turning to FIG. 1, a shaft deflection controller of the presently preferred embodiment is illustrated, connected to an input driveshaft 20 of a three stage, split torque rotorcraft transmission. The input driveshaft 20 is mounted to a rigid frame by utilizing a support member 22, containing apertures for one or more bolts. The input driveshaft 20 comprises a shaft deflection controller 24 and a spur pinion 26 disposed at an end of the input driveshaft 20 opposite the support member 22. A turbine engine (not shown) provides torque to the input driveshaft 20. The input driveshaft 20 is adapted for inputting the torque from the turbine engine, and rotates about an axis of rotation in a rotational direction of the arrow A1. The axis of rotation of the input driveshaft 20 changes with deflections of the input driveshaft 20.

A first face gear 28 and a second face gear 32 are adapted for meshing with the spur pinion 26 of the input driveshaft 20. The spur pinion 26 rotates around its axis of rotation in the direction of the arrow A1 and simultaneously drives both the first face-gear 28 in the direction of the arrow A2 and the second face-gear 32 in the direction of the arrow A3. Torque from the input driveshaft 20 is split between the first face gear 28 and the second face gear 32. One of the two face gears 28, 32 is located above the spur pinion 26 and the other of the two face gear 28, 32 is located below the spur pinion 26. This staggered arrangement of the two proximal face gears 28, 32 allows each of the two face gears 28, 32 to drive a shaft leading upward to a corresponding one of the first spur pinion 30 and the second spur pinion 34 of the transmission's output stage. The first spur pinion 30 rotates in the direction of the arrow A4, and the second spur pinion 34 rotates in the direction of the arrow A5.

Figure 2:
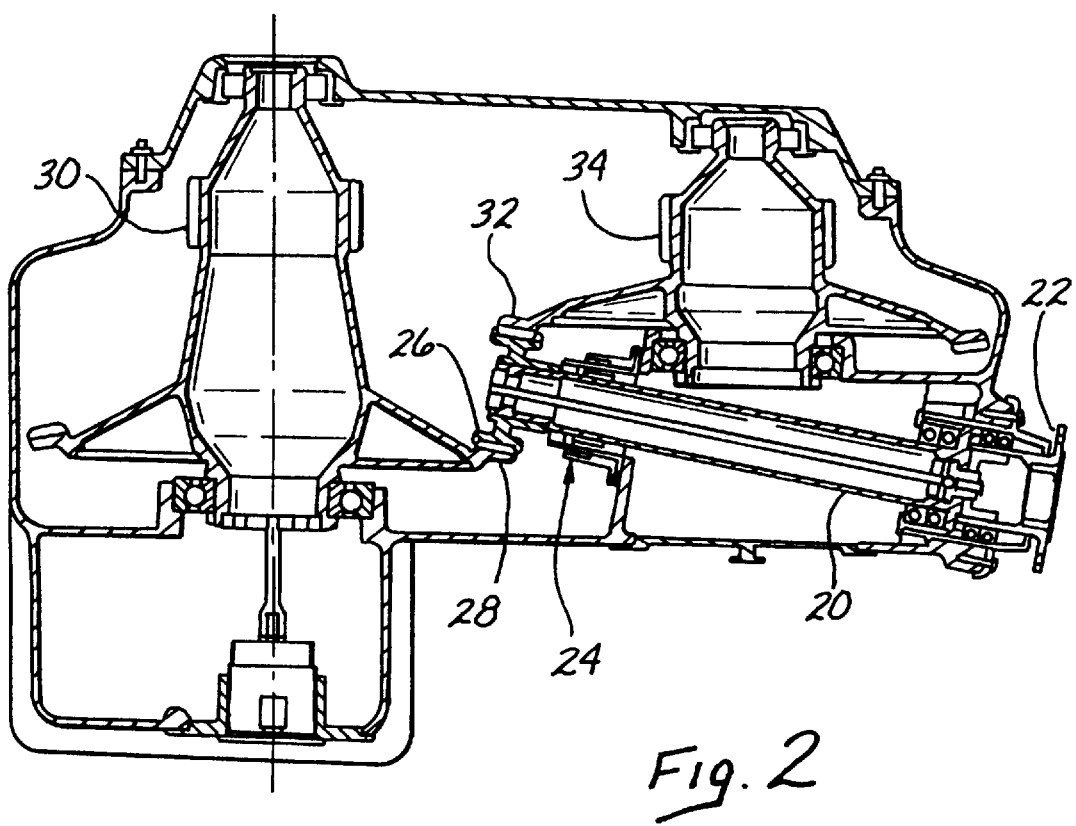
FIG. 2 is a cross-sectional view of the first and second stages of the advanced rotorcraft transmission according to the present invention.

The first spur pinion 30 and the second spur pinion 34 both simultaneously drive an internal combining gear 36, thus providing a recombination of torque at this gear. A second turbine engine (not shown) drives a second input driveshaft, third and fourth face gears, and third and fourth spur pinions (not shown) on a side of the combining gear opposite the input driveshaft 20. The second input driveshaft, third and fourth face gears, and third and fourth spur pinions (not shown) are configured in a similar manner to the input driveshaft 20, first and second face gears 28, 32, and first and second spur pinions 30, 32. The first, second, third, and fourth spur pinions, attached to the respective face gears, drive the large combining gear 36 in the direction of the arrow A6. The sun gear of the planetary stage 38, which rotates in the direction of arrow A6, rotates the planet gears thereabout to thereby drive a rotor shaft output of the planetary stage 38. FIG. 2 illustrates a cross-sectional view of the three stage, split torque rotorcraft transmission shown in FIG. 1. The cross section is taken through the input driveshaft 20 and through the shaft deflection controller 24 of the present invention.

Figure 3:
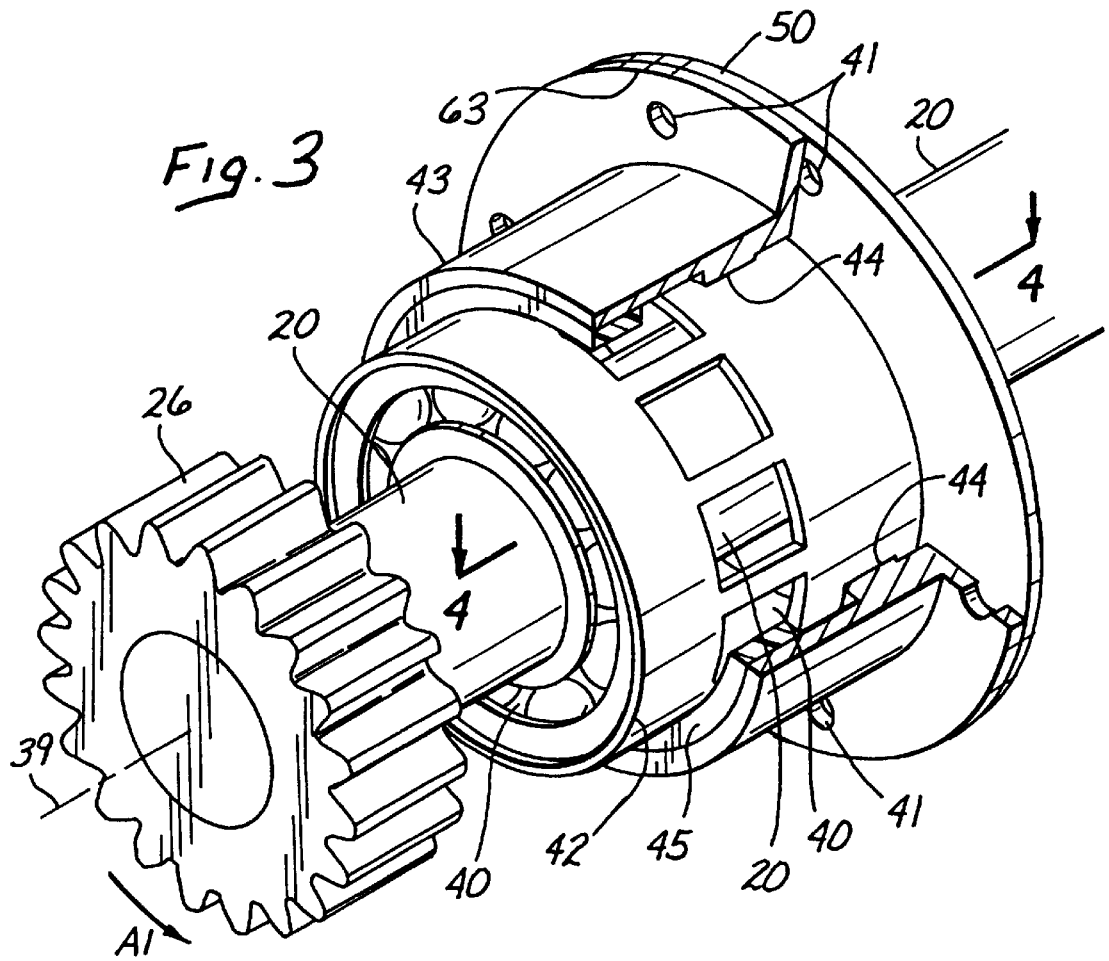
FIG. 3 is a perspective view of the shaft deflection controller according to the present invention.

A perspective view of the shaft deflection controller 24 of the presently preferred embodiment is illustrated in FIG. 3. The input driveshaft 20, rotating in the direction of the arrow A1, is shown with an axis of rotation 39. A front-end roller bearing 40 fits around the input driveshaft 20 and contacts a portion of the input driveshaft 20. The flexible shaft stabilizing mount 42 comprises a plurality of cage spring members 54 and a portion for contacting the front-end roller bearing 40. The portion of the inner surface 40 of the flexible shaft stabilizing mount 42, located near the spur pinion 26, is shown contacting the front-end roller bearing 40. The front-end roller bearing 40 is retained using set screws within the portion of the inner surface 40 of the flexible shaft stabilizing mount 42. These set screws preclude any slip of the front-end roller bearing 40 from occurring. The flexible shaft stabilizing mount 42 controls the deflection of the input driveshaft 20 by applying forces onto the input driveshaft 20, which tend to resist changes in the alignment of the axis of rotation 39 of the input driveshaft 20. The front-end roller bearing 40, input driveshaft 20, and the flexible shaft stabilizing mount 42 are preferably all concentric. The flexible shaft stabilizing mount 42 includes a mounting flange 50 connected to and concentric with the flexible shaft stabilizing mount 42. The spur pinion 26 is shown at the end of the input driveshaft 20.

An elastomeric damper 45 surrounds and contacts a portion of the flexible shaft stabilizing mount 42. A non-linear stiffening ring 43 surrounds and contacts both the elastomeric damper 45 and the flexible shaft stabilizing mount 42. An inner surface portion of the non-linear stiffening ring 43, which contacts and surrounds the flexible shaft stabilizing mount 42, contains a complex curvature 44. The non-linear stiffening ring 43 includes a stiffening-ring flange 63 connected to and concentric with the non-linear stiffening ring 43. Bolt apertures 41 are provided for passing through both the stiffening-ring flange 63 and the mounting flange 50, to thereby mount both the flexible shaft stabilizing mount 42 and the non-linear stiffening ring 43 to a rigid frame 61. The rigid frame 61 may comprise, for example, a transmission housing of the three stage, split torque rotor-craft transmission.

Figure 4:
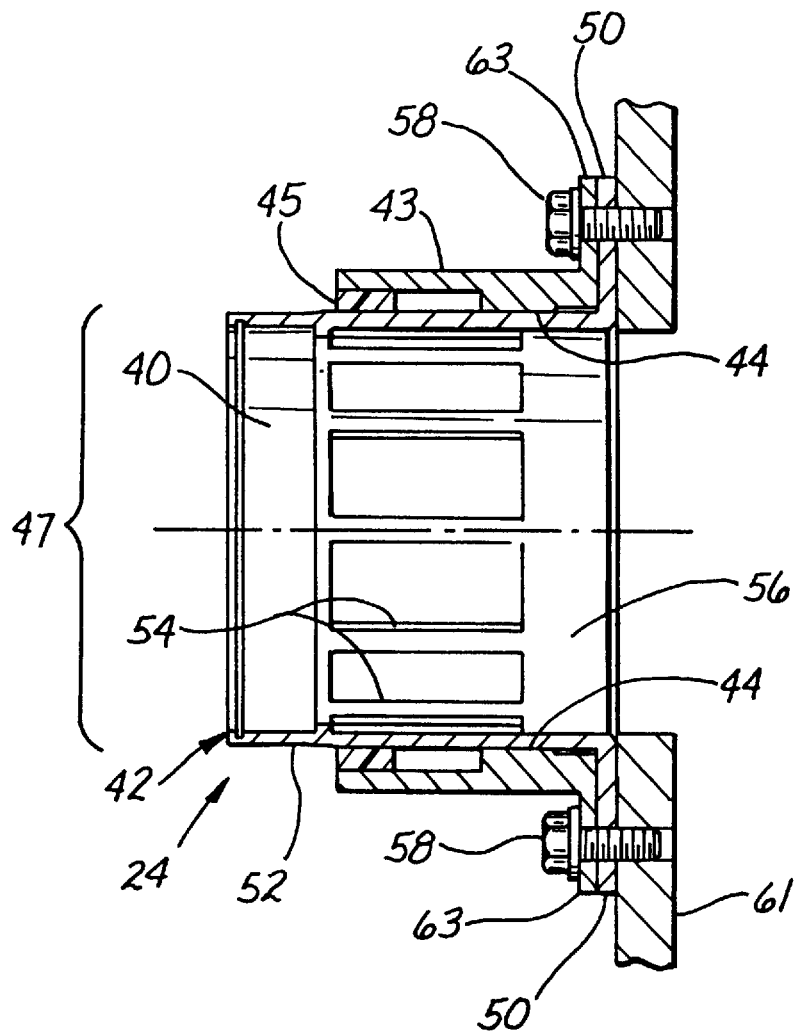
FIG. 4 is a cross-sectional view of the shaft deflection controller according to the present invention.

Turning to FIG. 4, a cross-sectional view of the shaft deflection controller 24, taken along the line 4, 4 of FIG. 3 is shown. The flexible shaft stabilizing mount 42 comprises an inner sleeve portion 47 and the mounting flange 50 connected to and concentric with the inner sleeve portion 47. The inner sleeve portion 47 contains a bearing-contacting portion 52 adapted for surrounding and contacting the front-end roller bearing 40, a base portion 56 connecting the inner sleeve portion 47 to the mounting flange 50, and a plurality of cage spring members 54. Each of the cage spring members 54 connects the bearing-contacting portion 52 of the inner surface 40 to the base portion 56. A plurality of rectangular apertures are disposed between the bearing-contacting portion 52 and the base portion 56, defining the plurality of cage spring members 54. Each of the plurality of cage spring members has a rectangular cross section, with the rectangular sides of each cage spring member 54 lying parallel to the axis of rotation 39. The cage spring members 54 provide flexibility to the flexible shaft stabilizing mount 42. The parallel positioning of the cage spring members 54 assures uniform cage spring compliance in any direction during operation of the shaft deflection controller 24 under load, to thereby achieve equal torque splitting under varying load conditions. The working range of the flexible shaft stabilizing mount 42 is large enough to accommodate movement of the input drive shaft 20 and allow the input drive shaft 20 to find its new center position of load balance between the two face gears 28, 30, during operation within a range of allowable loads.

The elastomeric damper 45 surrounds and contacts the inner sleeve portion 47 of the flexible shaft stabilizing mount 42. The inner surface portion of the non-linear stiffening ring 43, containing the complex curvature 44, surrounds and contacts both the cage spring members 54 and the base portion 56 of the flexible shaft stabilizing mount 42. The non-linear stiffening ring 43 also surrounds and contacts the elastomeric damper 45. The elastomeric damper 45 is thus sandwiched between the inner sleeve portion 47 of the flexible shaft stabilizing mount 42 and the non-linear stiffening ring 43. The non-linear stiffening ring 43 provides overload protection for the gear system components. As the flexible shaft stabilizing mount 42 deflects during normal operation, the non-linear stiffening ring 43 is not contacted by the inner sleeve portion 47, as the non-linear stiffening ring 43 is preferably designed with an allowable clearance which is not overcome during normal travel of the cage spring members 54. If a vibratory problem develops with the input drive shaft 20, the deflection of the cage spring members 54 begins to contact the complex curvature 44 of the non-linear stiffening ring 43. Additional deflection of the cage spring members 54 wraps the flexible shaft stabilizing mount 42 further along the inner, complex curved surface 44 of the non-linear stiffening ring 43, resulting in greater equivalent spring stiffness and subsequent protection of the gear system components due to avoidance of flailing action. Thus, the non-linear stiffening ring 43 provides an ever increasing resistance to deflections of the cage spring members 54. This ever increasing resistance results in a non-linear (or piecewise linear) stiffness of the shaft deflection controller 24, as the shaft deflection controller 24 acts with an increasing spring rate to suppress motions of the drive input shaft 20 as the amplitude of that motion increases.

Figure 5:
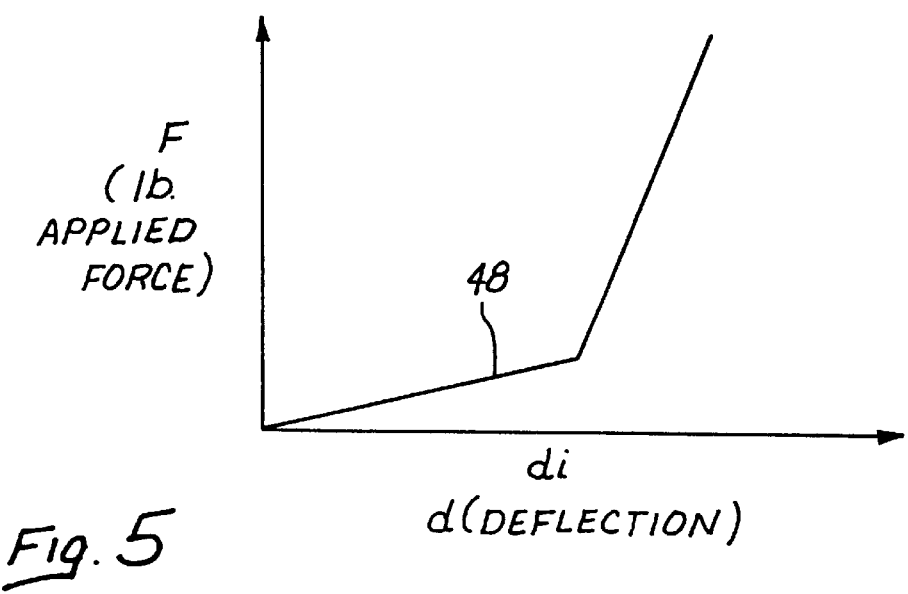
FIG. 5 is a plot of applied force versus deflection for the shaft deflection controller of the present invention.

The elastomeric damper 45 acts to reduce the amplitudes of forced input drive shaft 20 vibrations, as well as to reduce force transmissibility. These damping effects are due to the internal shear resistance to plastic flow provided by the elastomeric material of the elastomeric damper 45. This internal friction force of the material is proportional to the velocity of the equivalent mass of the input drive shaft 20. The elastomeric damper 45 thus protects the front-end roller bearing 40 and gears from instantaneous accelerations, which would result in high transient peak loads during operation. FIG. 5 illustrates a plot 48 of force applied to the input drive shaft 20, and resulting deflection of the input drive shaft 20. Deflection of the input drive shaft 20 is controlled to within tolerable limits, even when large amounts of force are applied thereto.

The shaft deflection controller 24 of the present invention allows for significant travel of the input drive shaft 20, in letting the input drive shaft 20 reach a force equilibrated position between the two face gears 28, 30. The non-directional (uniform) compliance of the cage spring members 54 allows for any direction of load application on the input drive shaft 20 during torque split operation. The shaft deflection controller 24 of the present invention assures resonance-free operation away from critical speeds by maintaining sub-critical shaft operation. The shaft deflection controller 24 is unlike prior art designs that are used to avoid resonance and super-critical shaft applications or to maintain alignment between high-speed coupled shafts. The positive safety stops, which are provided by some of the existing designs, require deflections to reach a predetermined value before functioning to limit shaft flailing. The non-linear stiffening ring 43 does not allow deflections of the input drive shaft 20 to reach near critical values before providing restraints but, rather, slowly increases the equivalent spring stiffness due to increasing contact of the cage spring members 54 with the complex curvature surface 44.

The stiffening-ring flange 63 is connected to and concentric with the non-linear stiffening ring 43. The stiffening-ring flange 43 comprises at least one aperture for accommodating the bolt 58 therethrough. The apertures of the stiffening-ring flange 63 and the mounting flange 50 are aligned for accommodating the same bolts. A plurality of bolts 58 are preferably used to secure the mounting flange 50 and the stiffening-ring flange 63 to the transmission housing 61, through the aligned apertures of the mounting flange 50 and flange 63.

Although an exemplary embodiment of the invention has been shown and described, many other changes, modifications and substitutions, in addition to those set forth in the above paragraphs, may be made by one having ordinary skill in the art without necessarily departing from the spirit and scope of this invention.

We claim:

1. A shaft deflection controller, comprising:

a bearing adapted for contacting a portion of an input driveshaft, the bearing being adapted for fitting around the driveshaft;

a flexible stabilizing mount fitting around and contacting the bearing and controlling a deflection of the input driveshaft;

connecting means for mounting the flexible shaft stabilizing mount to a frame;

an elastomeric damper surrounding and contacting the flexible shaft stabilizing mount; and a stiffening ring surrounding and contacting both the elastomeric damper and the flexible shaft stabilizing mount.

2. The shaft deflection controller according to claim 1, the elastomeric damper being sandwiched between the flexible shaft stabilizing mount and the stiffening ring.

3. The shaft deflection controller according to claim 2, the stiffening ring comprising an inner surface portion, which contacts the flexible shaft stabilizing mount and which comprises a curvature.

4. A shaft deflection controller in combination with a split torque transmission, comprising:

an input driveshaft adapted for inputting power from an engine, the input driveshaft comprising a spur pinion at an end of the input driveshaft;

two face gears adapted for meshing with the spur pinion of the input driveshaft;

a bearing adapted for contacting a portion of the input driveshaft near the spur pinion of the input driveshaft;

a flexible shaft stabilizing mount adapted for contacting the bearing and for controlling a deflection of the input driveshaft;

a stiffening ring disposed around the flexible shaft stabilizing mount, the stiffening ring having at least one curved surface, which comprises a curvature and which is adapted to contact the flexible shaft stabilizing mount, the flexible shaft stabilizing mount being adapted to be displaced with the deflections of the input driveshaft, the stiffening ring being adapted to provide overload protection to the shaft deflection controller by providing increasing surface contact and resistance to increasing displacement of the flexible shaft stabilizing mount; and connecting means for mounting the flexible shaft stabilizing mount to a frame.

5. A shaft deflection controller, comprising:

a bearing adapted for contacting a portion of an input driveshaft, the bearing being adapted for fitting around the driveshaft;

a flexible shaft stabilizing mount adapted to fit around and contact the bearing and to control a deflection of the input driveshaft, the flexible shaft stabilizing mount being adapted to be displaced in response to deflections of the input driveshaft;

a stiffening ring disposed around the flexible shaft stabilizing mount, the stiffening ring having at least one surface which is adapted to contact the flexible shaft stabilizing mount, the stiffening ring being adapted to provide overload protection to the shaft deflection controller by providing increasing surface contact and resistance to increasing displacements of the flexible shaft stabilizing mount;

connecting means for mounting the flexible shaft stabilizing mount to a frame; and an elastomeric damper surrounding and contacting the flexible shaft stabilizing mount.

6. The shaft deflection controller according to claim 5, wherein the input driveshaft has an axis of rotation, and wherein an alignment of the axis of rotation changes, relative to the frame, with deflections of the input driveshaft.

7. The shaft deflection controller according to claim 6, wherein the flexible shaft stabilizing mount is adapted for controlling deflections of the input driveshaft by applying onto the input driveshaft forces, which tend to resist changes in the alignment of the axis of rotation of the input driveshaft.

8. The shaft deflection controller according tho claim 5, wherein the bearing, the input driveshaft, the flexible shaft stabilizing mount, and the elastomeric damper are all concentric.

9. The shaft deflection controller according to claim 8, the flexible shaft stabilizing mount comprising:

an inner sleeve portion; and a mounting flange connected to and concentric with the inner sleeve portion.

10. The shaft deflection controller according to claim 9, the connecting means comprising at least one aperture in the mounting flange for accommodating a bolt.

11. The shaft deflection controller according to claim 9, the inner sleeve portion of the flexible shaft stabilizing mount comprising:

a bearing-contacting portion adapted for surrounding and contacting the bearing;

a base portion connecting the inner sleeve portion to the mounting flange; and a plurality of cage spring members, each of the cage spring members connecting the bearing-contacting portion to the base portion.

12. The shaft deflection controller according to claim 11, the plurality of cage spring members being disposed parallel to one another.

13. The shaft deflection controller according to claim 12, the inner sleeve portion comprising a plurality of rectangular apertures disposed between the bearing-contacting portion and the base portion.

14. The shaft deflection controller according to claim 13, the plurality of rectangular apertures defining the plurality of cage spring members.

15. The shaft deflection controller according to claim 9, wherein the elastomeric damper surrounds and contacts the inner sleeve portion of the flexible shaft stabilizing mount.

16. The shaft deflection controller according to claim 15, further comprising a stiffening ring surrounding and contacting both the elastomeric damper and the inner sleeve portion of the flexible shaft supporting mount.

17. The shaft deflection controller according to claim 16, the stiffening ring comprising a stiffening-ring flange connected to and concentric with the stiffening ring, the stiffening-ring flange having at least one aperture for accommodating a bolt.

18. The shaft deflection controller according to claim 17, the elastomeric damper being sandwiched between the inner sleeve portion and the stiffening ring.

19. The shaft deflection controller according to claim 18, the stiffening ring comprising an inner surface portion, which contacts the inner sleeve portion.

20. The shaft deflection controller according to claim 19, the inner surface portion of the stiffening ring comprising a curvature.

21. The shaft deflection controller according to claim 20, the apertures of the stiffening-ring flange and the mounting flange being aligned for accommodating bolts therethrough.

22. A shaft deflection controller, comprising:
a bearing;
a flexible shaft stabilizing mount adapted to fit around and contact the bearing, the flexible shaft stabilizing mount comprising a bearing-contacting portion surrounding and contacting the bearing, a base portion, and a plurality of cage spring members disposed between and connecting the bearing-contacting portion and the base portion; and
a stiffening ring surrounding the flexible shaft stabilizing mount, the stiffening ring comprising an inner surface portion, which contacts the flexible shaft stabilizing mount and which comprises a curvature, wherein the cage spring members are adapted to be displaced in response to vibrations of a shaft to which the shaft deflection controller is coupled, the stiffening ring being adapted to provide overload protection to the shaft deflection controller by increasing surface contact and resistance to increasing deflections of the cage spring members.

23. The shaft deflection controller as recited in claim 22, wherein a clearance is provided between the stiffening ring and the cage spring members of the flexible shaft stabilizing mount, whereby the stiffening ring and the cage spring members of the flexible shaft stabilizing mount do not contact each other during relatively low vibratory conditions.

24. The shaft deflection controller as recited in claim 23, wherein the cage spring members of the flexible shaft stabilizing mount are adapted to contact the inner surface of the stiffening ring during relatively moderate vibratory conditions.

25. The shaft deflection controller as recited in claim 24, wherein the cage spring members of the flexible shaft stabilizing mount are adapted to contact a greater portion of the inner surface of the stiffening ring during relatively high vibratory conditions.

26. The shaft deflection controller as recited in claim 22, wherein the shaft deflection controller further comprises an elastomeric damper surrounding and contacting a portion of the flexible shaft stabilizing mount.

27. The shaft deflection controller as recited in claim 26, wherein the inner surface portion of the stiffening ring contacts both the base portion and the plurality of cage spring members of the flexible shaft stabilizing mount.

28. The shaft deflection controller as recited in claim 27, wherein the stiffening ring surrounds and contacts both the flexible shaft stabilizing mount and the elastomeric damper.

29. A shaft deflection controller, comprising:
a bearing;
a flexible shaft stabilizing mount, a portion of the flexible shaft stabilizing mount surrounding and contacting the bearing;
an elastomeric damper surrounding and contacting a portion of the flexible shaft stabilizing mount; and
a stiffening ring surrounding and contacting both the flexible shaft stabilizing mount and the elastomeric damper, the stiffening ring comprising an inner surface portion, which comprises a curved surface that is adapted to contact the flexible shaft stabilizing mount.

30. The shaft deflection controller as recited in claim 29, wherein a clearance is provided between the stiffening ring and the flexible shaft stabilizing mount, whereby the stiffening ring and the flexible shaft stabilizing mount do not contact each other during relatively low vibratory conditions.

31. The shaft deflection controller as recited in claim 29, wherein the flexible shaft stabilizing mount is adapted to be displaced in response to vibrations of a shaft to which the shaft deflection controller is coupled, the stiffening ring being adapted to provide overload protection to the shaft deflection controller by providing an increasing resistance to increasing deflections of the flexible shaft stabilizing mount.

32. The shaft deflection controller as recited in claim 31, wherein a clearance is provided between the stiffening ring and the flexible shaft stabilizing mount, whereby the stiffening ring and the flexible shaft stabilizing mount do not contact each other during relatively low vibratory conditions.

33. The shaft deflection controller as recited in claim 32, wherein the flexible shaft stabilizing mount is adapted to contact the inner surface of the stiffening ring during relatively moderate vibratory conditions.

34. The shaft deflection controller as recited in claim 33, wherein the flexible shaft stabilizing mount is adapted to contact a greater portion of the inner surface of the stiffening ring during relatively high vibratory conditions.

* * * * *